May 27, 1969

L. E. MANNING 3,446,247

HOSE

Filed April 21, 1966

INVENTOR.
LORAN E. MANNING
BY
J.B. Holden
ATTORNEY

United States Patent Office

3,446,247
Patented May 27, 1969

3,446,247
HOSE
Loran E. Manning, Medina, Ohio, assignor to The Goodyear Tire & Rubber Company, Akron, Ohio, a corporation of Ohio
Filed Apr. 21, 1966, Ser. No. 544,300
Int. Cl. F16l *11/08*
U.S. Cl. 138—119                                                10 Claims This invention relates to a flexible hose and in particular to a hose having low elongation properties especially suitable for use on lineal actuator devices.

The type of hose disclosed in this application is particularly useful with lineal actuators which move an object back and forth along a lineal path. One use of such an actuator is to drive a freight car mover for use on railroad sidings. A typical railroad car mover consists of a wheeled sled-like vehicle which is driven back and forth along the rails and is adapted to contact a portion of a freight car and move the freight car to a desired location along the tracks. Although this car mover does not itself form a part of this invention it will be described briefly later in this specification to show the manner in which the hose is used with the lineal actuator system and to better illustrate the need for a hose structure of the particular design described in this application.

A primary object of this invention is to provide a flexible hose having low elongation properties in the longitudinal direction but having greater elongation properties and more flexibility in the circumferential direction.

A further object of this invention is to provide a hose which will withstand repeated folding and flattening without substantial wear or cracking of either the hose body or the reinforcement layers therein.

A still further object of this invention is to provide a hose which is especially suitable for use in a lineal actuator system.

Other objects and advantages of this invention will become apparent as the description proceeds in the following specifications and drawings.

Figure 1:
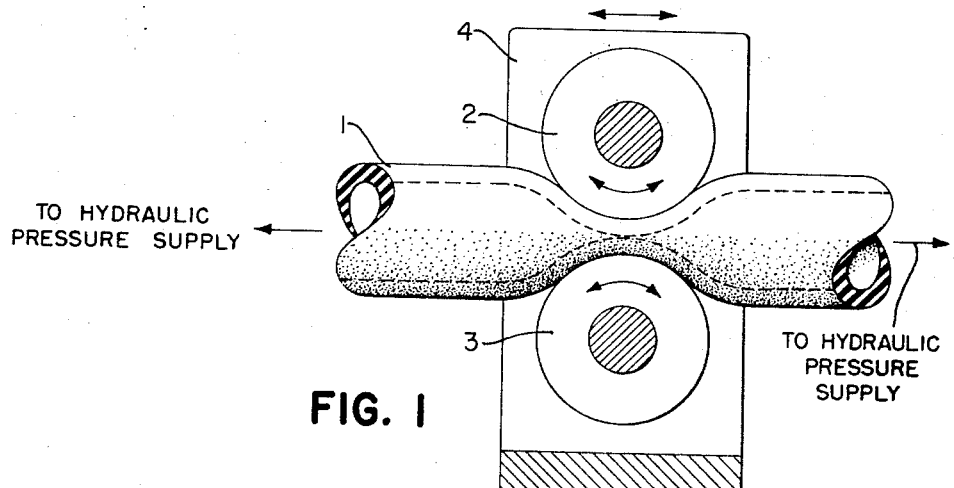
FIG. 1 shows a fragmentary cross-sectional view of a lineal actuator taken along the line 1—1 of FIG. 2 with a length of hose used therewith.
Figure 2:
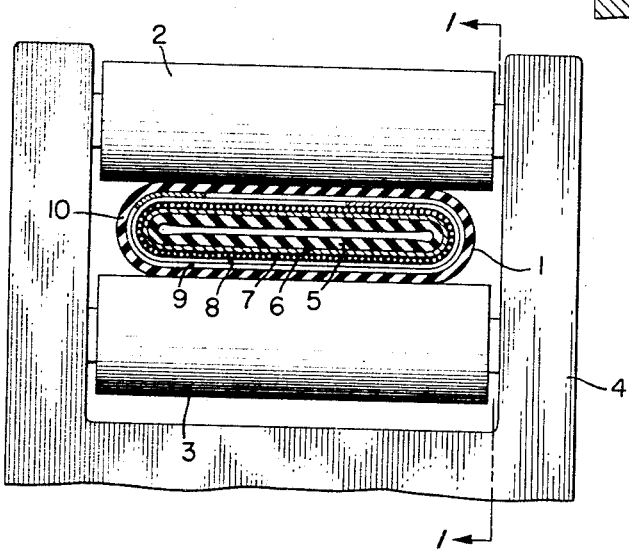
FIG. 2 shows a fragmentary end view of the actuator and hose shown in FIG. 1.
Figure 3:
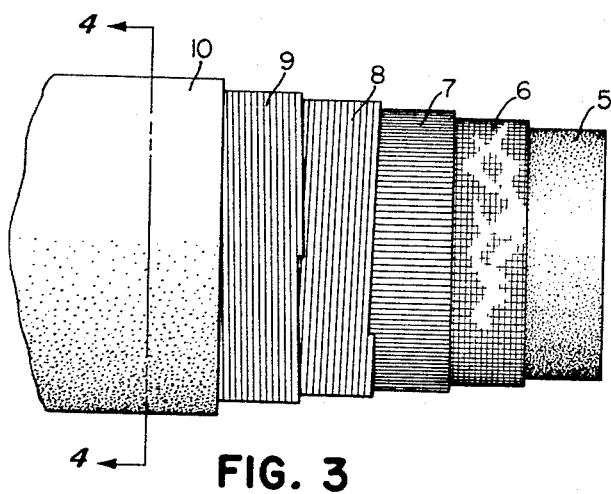
FIG. 3 shows a hose construction embodying this invention with successive layers broken away to show the construction thereof.
Figure 4:
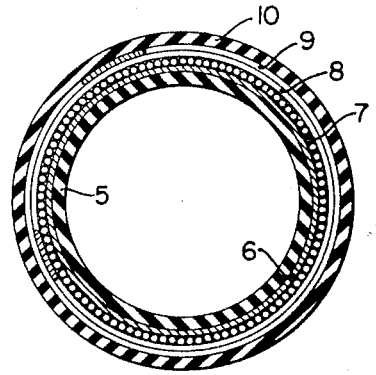
FIG. 4 shows a cross-sectional view taken along line 4—4 of FIG. 3.

Referring now to FIGS. 1 and 2, the numeral 1 represents a segment of hose of the type shown in FIGS. 3 and 4. The hose 1 passes between a pair of parallel rollers 2 and 3 rotatably mounted in a U-shaped frame 4 which is attached to a railroad car mover (not shown in the drawings). As previously mentioned a typical freight car mover is a wheeled sled-like vehicle which is driven along the tracks to push freight cars to a desired location for loading and unloading. It may ride on the same rails as the freight car or on a separate set of rails arranged in alignment therewith. The hose 1 lies stationary between the rails with each end thereof connected to a hydraulic pump (not shown) which forces hydraulic fluid under pressure into the hose from either end, depending upon the particular valve combination used. The hose 1 is pinched between the rollers 2 and 3 in such a manner that the flow of hydraulic fluid therethrough is restricted. As hydraulic fluid under pressure enters the hose from one end, it travels through the hose until it reaches the area pinched by the rollers. At this point the pressure against the closely spaced rollers 2 and 3 pushes the frame 4 away from the direction of the fluid pressure. Movement of the frame 4 will of course move the freight car mover sled in the same direction. To reverse the direction of travel of the freight car mover it is only necessary to apply the hydraulic fluid under pressure from the opposite end of the hose 1.

In order to provide a hose which will withstand the operating conditions required in this type of actuator the hose must be sufficiently flexible to permit flattening between the rollers 2 and 3 and yet have sufficient low elongation properties to substantially eliminate any stretching of the hose in the longitudinal direction. The hose structure, as shown in FIGS. 3 and 4, is particularly well suited for these operating conditions. The hose consists of an inner tube 5 of elastomeric material. It is preferable that the tube 5 be made of an oil resisting rubber such as neoprene. The tube 5 is surrounded by a layer 6 of knitted or loosely woven fabric, such as cotton, or other similar materials. Surrounding the layer 6 is a layer 7 of longitudinal strands which are preferably low twist or zero twist polyester cords that have been heat stretched for low elongation. An example of low elongation would be approximately 15% ultimate elongation. Surrounding layer 7 is the layer 8 of circumferential cords wound with a relatively small helix angle. The cords of layer 8 are preferably of a high twist nylon which are capable of high elongation. An example of high elongation would be approximately 25% ultimate elongation. Surrounding the layer 8 of circumferential cords is a second circumferential layer 9 of the same type of cord as layer 8 but wound with an opposite helix angle. An outer cover 10 of elastomeric material surrounds the layer 9 to provide increased protection against abrasion from the rollers. The hose, however, may also be made without the outer elastomeric cover. After assembly of all the layers, the hose is vulcanized to form the elastomeric portion and the reinforcing layer into an integral whole.

Referring now to FIG. 2, it may be seen that when the hose 1 is pinched between rollers 2 and 3 it is subjected to extreme flattening which results in sharp bending of the reinforcement layers of the hose. The innermost layers are, of course, subjected to the serverest bending to the smaller radius of bend. By positioning the circumferential cords outwardly from the longitudinal cords the radius of bend is increased therein and they are therefore subjected to less tension during bending as the hose passes between the rollers. The longitudinal cords of layer 7 unlike the circumferential cords are never crimped about a sharp radius so they may be placed inwardly from the circumferential cords in the structure without subjecting them to undue wear.

It will be understood that additional layers similar to the longitudinal cords of layers 7, or the circumferential cords of layers 8 and 9 may be used without departing from the scope of this invention. Two or more of the layers 7 may be used followed by two or more additional layers 8 and 9. It will also be understood that the longitudinal cords of layer 7 may be interspersed between subsequent layers 8 and 9. The primary feature of the invention is not necessarily the sequence in which the layers are arranged but is the use of circumferential cords having greater elongation properties than the longitudinal cords with the longitudinal and circumferential cords being in distinct separate layers within the hose so that each layer may perform its own particular function without interference from the other layers.

Various changes can be made in the illustrative embodiments shown herein without departing from the scope of the invention.

What is claimed is:

1. A flexible hose for use between parallel pinch rollers on lineal actuator devices comprising:

(A) an inner tube of elastomeric material;
(B) at least one layer of flexible longitudinal, reinforcement strands surrounding the tube, said strands having low elongation properties;
(C) at least one layer of circumferentially wrapped reinforcement strands having higher elongation properties than the longitudinal strands;
(D) the elastomeric portion of said hose being vulcanized to form an integral whole with the reinforcement layers embedded therein; and
(E) the longitudinal reinforcement strands preventing longitudinal elongation of the hose when used on a lineal actuator and the circumferential strands permitting the hose to expand radially under internal pressure to act upon the pinch rollers of the lineal actuator to move it in a longitudinal direction along the hose.

2. A hose as claimed in claim 1 having a plurality of layers of circumferential strands wherein half of said layers are laid at one helix angle and the remaining half of said layers are laid the opposite helix angle.

3. A hose as claimed in claim 1 wherein the longitudinal strands comprised low twist low elongation polyester cords.

4. A hose as claimed in claim 1 wherein the circumferential strands comprise high twist nylon cords.

5. A hose as claimed in claim 1 wherein at least one layer of longitudinal strands are interspersed between layers of circumferential strands.

6. A hose as claimed in claim 1 wherein layers of circumferential strands are alternately interspersed between layers of longitudinal strands.

7. The hose as claimed in claim 1 having a layer of fabric having high elongation properties between the inner tube and the layer of longitudinal strands.

8. A hose as claimed in claim 1 which has a flexible outer cover surrounding the circumferentially wrapped layer.

9. A hose as claimed in claim 8 wherein both the inner tube and the outer cover are made of rubber.

10. A flexible hose for use between pinch rollers on a lineal actuator comprising:

(A) an inner tube of oil resistant rubber;
(B) a layer of stretchable knitted fabric surrounding the inner tube;
(C) at least one reinforcement layer of longitudinal low twist cords having low elongation properties;
(D) at least two reinforcement layers of circumferentially wrapped high twist cords having higher elongation properties than the longitudinal cords, each circumferential layer having the cords therein disposed at an opposite helix angle to those of the adjacent layer;
(E) a flexible outer cover of oil resistant rubber;
(F) the rubber of the inner tube and outer cover being vulcanized to form an integral whole with the reinforcement layers embedded therein; and
(G) the longitudinal reinforcement cords preventing longitudinal elongation of the hose when used on a lineal actuator and the circumferential cords permitting the hose to expand radially under internal pressure to act upon the pinch rollers of the lineal actuator to move it in a longitudinal direction along the hose.

References Cited

UNITED STATES PATENTS

| | | | |
|---|---|---|---|
| 184,907 | 11/1876 | Reed | 138—126 |
| 296,436 | 4/1884 | Murphy | 138—137 |
| 757,857 | 4/1904 | Bosch | 138—137 |
| 2,097,862 | 11/1937 | McKay | 138—137 XR |
| 2,899,982 | 8/1959 | Harpfer | 138—137 |
| 2,969,812 | 1/1961 | Ganahl | 138—137 XR |
| 3,056,429 | 10/1962 | Wilberg | 138—126 |

FOREIGN PATENTS 195,925   5/1965   Sweden.

LAVERNE D. GEIGER, *Primary Examiner.*

H. K. ARTIS, *Assistant Examiner.*

U.S. Cl. X.R.

138—126, 137